United States Patent [19]
Held

[11] Patent Number: 5,405,470
[45] Date of Patent: Apr. 11, 1995

[54] METHOD AND DEVICE FOR SPLICING TWO THIN WEBS OF MATERIAL

[76] Inventor: Alfons N. Held, Rue de Merl 61, Luxembourg, Luxembourg

[21] Appl. No.: 182,152
[22] PCT Filed: Aug. 3, 1992
[86] PCT No.: PCT/US92/06501
   § 371 Date: Feb. 1, 1994
   § 102(e) Date: Feb. 1, 1994
[87] PCT Pub. No.: WO93/02955
   PCT Pub. Date: Feb. 18, 1993

[30] Foreign Application Priority Data

Aug. 2, 1991 [FR] France ................... 91 09860

[51] Int. Cl.$^6$ ................................ B65H 21/00
[52] U.S. Cl. ......................... 156/159; 156/304.3; 156/505; 248/363; 83/100; 83/648
[58] Field of Search .......... 156/157, 159, 304.1, 156/304.3, 505, 506; 269/21; 83/100, 648; 248/363, 683

[56] References Cited

U.S. PATENT DOCUMENTS

| | | | |
|---|---|---|---|
| 1,781,200 | 11/1930 | Spiros | 156/502 X |
| 3,227,594 | 1/1966 | Ryan | 242/556.1 X |
| 3,537,940 | 11/1970 | Nagano | 156/505 |
| 3,773,598 | 11/1973 | Taeffner et al. | 156/505 |
| 4,146,661 | 3/1979 | Grandel et al. | 156/506 X |
| 4,693,458 | 9/1987 | Lewecke et al. | 269/21 |
| 5,320,694 | 6/1994 | Dietzsch | 156/304.3 X |

FOREIGN PATENT DOCUMENTS 2513664  10/1976  Germany ................ 156/505

*Primary Examiner*—Mark A. Osele

[57] ABSTRACT

In a device for splicing two thin film web portions comprising a roll supplying a web of film material, a roll for winding a web of film material and a splicing table adapted to be subject to sub-atmospheric pressure and having a first groove therein defining a cutting line and a reel for applying a splicing tape to unite said first and second webs of film, the splicing table includes a second groove that is parallel to the first groove, both grooves being perpendicular to the longitudinal direction of the webs of film, the vacuum table being thus split into three regions each individually adapted to be put under sub-atmospheric pressure, the device being useful for highly accurate splicing of webs of ultra-thin film material.

10 Claims, 3 Drawing Sheets

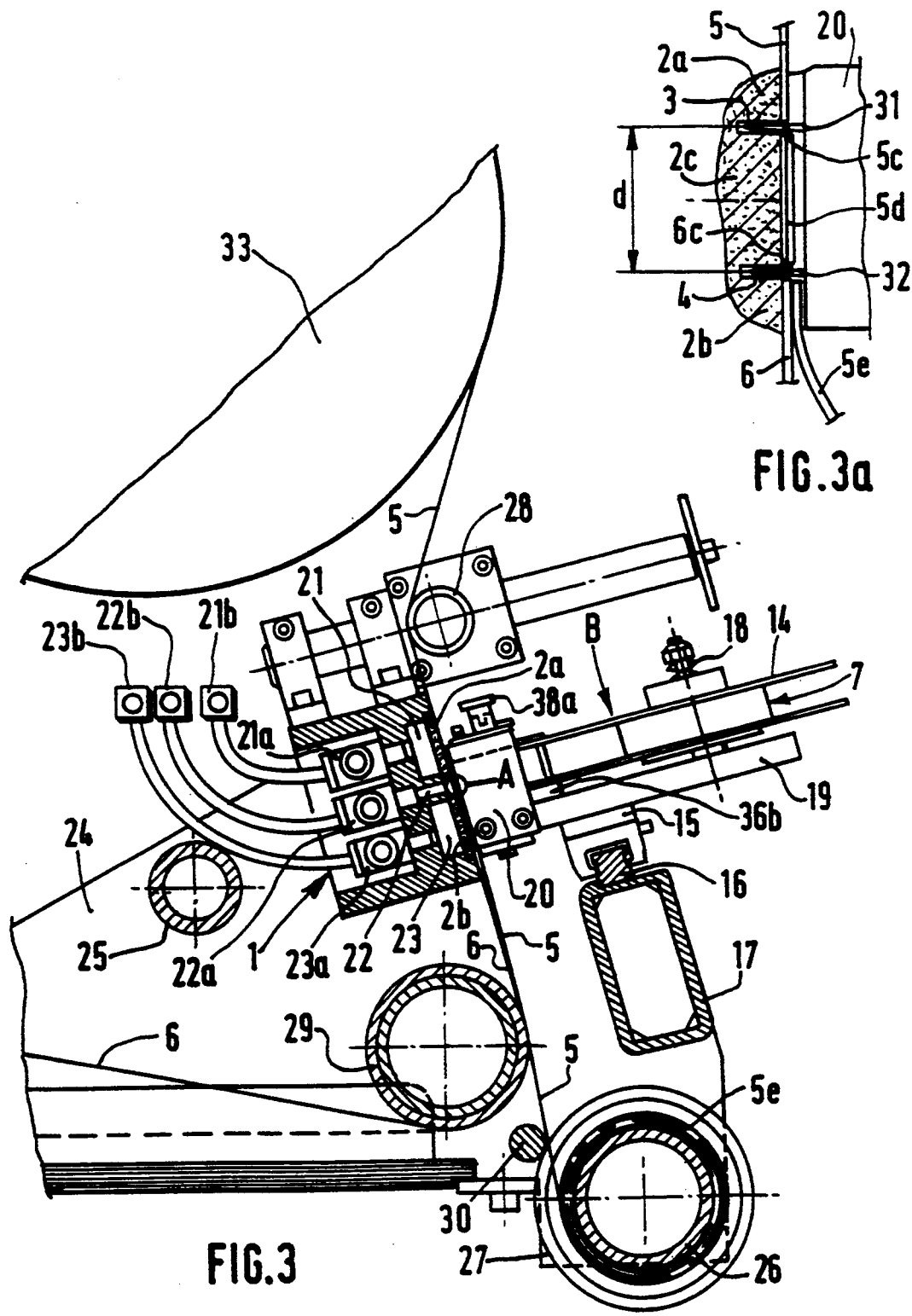

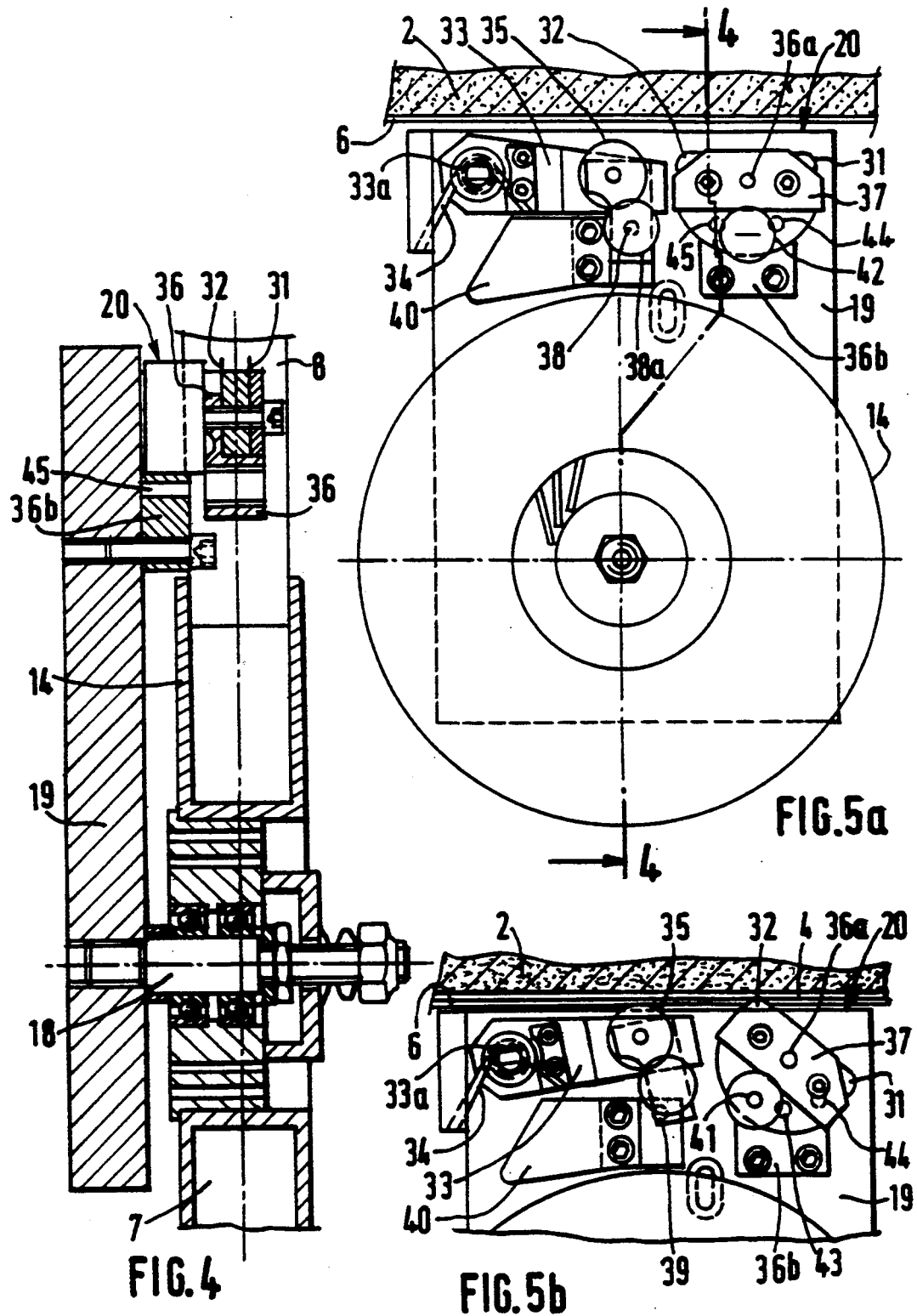

METHOD AND DEVICE FOR SPLICING TWO THIN WEBS OF MATERIAL

BACKGROUND OF THE INVENTION

The present invention relates to a method for splicing a first length or web of film material to a second web of film material. It also relates to a device for carrying out the said method comprising a roll for unwinding a first web of film material to be spliced, a roll for winding film material to be spliced and a splicing table subjected to vacuum and having a cutting groove over which the web of film to be wound or unwound can pass, together with means for applying an adhesive splicing tape.

The splicing of two extremely thin films is a difficult operation involving problems not only in making the actual splice, but also in ensuring that the splice obtained is sufficiently reliable and does not in any way alter the behavior of the thin film material during subsequent processing (application of metallization to the film surface, or even reading and/or writing of information on said film after application of a magnetic material coating thereto) or during winding or unwinding. It is in fact an extremely difficult operation to accurately apply a narrow tape of adhesive film simultaneously onto two prepared end portions of film strip, principally as as a result of the significant electrostatic forces that exist between the two end portions of the static-charged film, prior to bringing the adhesive tape into bonding contact with said film, such electrostatic charges almost always having the effect of causing one of the three elements involved in the splicing operation to move with respect to the two others prior to bonding contact being able to be achieved. Moreover, splices formed in a web of extremely thin film using a narrow strip of splicing tape have to date proved to be totally unsuccessful in withstanding repeated folding and tractional forces to which they may be subject, not as a result of a lack of strength of the bonded surface but rather through the effect of shearing forces that are exercised by two lengths of spliced film in which the ends are in a touching or to all intents and purposes a touching or butt relationship.

A further significant disadvantage of splices provided in thin films that take the form of a butt joint to which a narrow band of splicing tape has been applied results from the sudden shock which is inevitably produced by the excess thickness at the point of splicing when the film passes between guide or drive rolls or even in front of a read and/or write head in the case where the film is used as an information carrier by application of a magnetic material coating thereto, or during other suchlike operations on the tape. Similarly, metallization operations which are currently carried out on films that have been spliced exhibit visual discontinuities and other manifestations in the spliced area.

One object of the present invention consists in providing a method and a device for splicing two lengths of thin film in which accurate joining of the two portions of film is facilitated and partly automated without the participants in the splice being able to move under the effects of static electricity.

A further object is to provide a splice between two portions of thin film which during use is not only as strong when subject to tractional forces as the unspliced film but which also is as strong, when subject to alternating bending forces and to general stresses, as the original film whereby if the film does break, it does not break at the splice but rather at another point on the film.

A further object is to obtain a splice in two lengths of extremely thin film where the splice itself is as thin as possible. To achieve such a thin splice, it should be possible to employ a very thin adhesive splicing tape which, after application to said thin film, is barely thicker than the spliced film, bearing in mind that splices in thin film are currently provided using splicing tape which, in the case of very thin films, is some twenty times thicker than the film itself, in order to obtain sufficient rigidity and mechanical strength from the narrow strip of splicing tape.

SUMMARY OF THE INVENTION

The invention hence provides a method for splicing a first web of film or sheet material to a second web thereof comprising the steps of applying an end portion of a first web of film to the surface of a vacuum table by applying sub-atmospheric pressure or vacuum thereto and making a straight transverse cut through said first web by knife means cooperating with a first transverse groove provided in said vacuum table, removing the sub-atmospheric pressure below the portion of said first web that has been trimmed off and removing said trimmed-off portion of film, applying the end portion of said second web of film onto the portion of said vacuum table not covered by said first web and allowing the end of said second web to overlap the previously-trimmed first web, the whole surface of said vacuum table being under sub-atmospheric pressure, providing a straight transverse cut through said second web by cooperation of cutting means with a second groove in said vacuum table parallel to said first groove and adjacent thereto, removing the thus-trimmed portion of said second film from the surface of said table together with the portion thereof overlapping said first web after, if necessary, removing said sub-atmospheric pressure only in the part of said vacuum table comprised between said first and second grooves, and simultaneously applying to said first and second web end portions an adhesive tape of which at least the portion that faces the gap between said first and second grooves does not contain adhesive, and then removing said sub-atmospheric pressure over the whole surface of said vacuum table in order to release the spliced webs of film.

According to one feature of the invention, the adhesive tape carries at the surface thereof two continuous stripes of adhesive which extend up to the region of, but not exactly to the edge of, the lateral sides of said tape where it ceases to be in contact with either of said web portions in order to prevent any overflow of adhesive resulting from supplementary spreading of the adhesive during the passage of said tape over the two film portions to be spliced.

According to another feature, the adhesive tape is covered, on the side thereof bearing said continuous stripes of adhesive, with a backing strip or layer in a material exhibiting low adhesion towards said adhesive, said adhesive tape covered with said backing layer being provided in roll form, said roll being unwound onto the facing end portions of the two webs of film to be spliced while removing said backing strip immediately prior to applying said adhesive tape onto the two facing end portions of said webs. During application of the adhesive tape onto the two end portions of said webs to be spliced, the part of said vacuum table comprised between said first and second grooves is maintained under sub-atmospheric pressure in order to retain said adhesive tape firmly pressed onto the end portions of said first and second webs.

The invention also provides a device for carrying out splicing, the device comprising a roll supplying a web of film material, a roll for winding a web of film material and a splicing table adapted to be selectively subject to sub-atmospheric pressure or vacuum and having a first groove therein defining a cutting line over which either of said first or second continuous strips of film can be placed, and means for applying a splicing tape to unite said first and second webs of film, wherein said splicing table includes two grooves that are parallel and perpendicular to the longitudinal direction of the first and second webs of film and being separated by a small spacing from each other, said small spacing being substantially less than the width of said splicing tape, the vacuum table being split into three regions each individually adapted to be put under sub-atmospheric pressure and comprising the region between the two said grooves and two regions at each side of the said grooves, said regions being adapted to be linked by valve means to sub-atmospheric pressure generating means whereby each one of said three zones can be individually or simultaneously put under sub-atmospheric pressure in order to retain at least one of said web portions of film firmly on said table or to allow removal thereof by cutting off said sub-atmospheric pressure.

According to another feature of the device, it includes a reel for applying an adhesive splicing tape to film web portions retained on said vacuum table by unwinding said adhesive tape therefrom, said application reel being rotatably mounted on a support adapted to move in a direction perpendicular to the plane of said vacuum table up to a position where it no longer hinders the passage of a web of film to a winding unit.

The device can include a carriage able to move along sliding guiding means perpendicular to the longitudinal direction of advance of said web of film and which simultaneously carries in a releasable manner, a roll of adhesive tape that is substantially centered on the two grooves of said vacuum table, said carriage being able to move between an operating position and a non-operating position, at least one cutting unit adapted to apply, in said operating position, a knife blade means into at least one of said grooves in order to cut said web portions of film at positions corresponding to said grooves whereby said cut web portions of film are only separated by the gap between said two parallel grooves. The cutting unit includes a blade holder clamping two thin cutting blades and adapted to pivot about a pivot pin to adopt one of three positions that are manually locked by a locking means, comprising two blade cutting positions and a central non-active position. The cutting unit preferably includes a pivoting arm carrying a press-on roller which is urged towards the surface of the vacuum table by application of spring pressure. The pivoting arm can be manually locked in a non-active position against the force of the spring means by manual locking means.

Further objects, advantages and features of the invention will become more clear from the description of an embodiment thereof which follows and is provided by way of non-limiting example and with reference to the attached drawings.

BRIEF DESCRIPTION OF THE DRAWINGS

In the drawings:

FIG. 3 is a partial side view, partly in cross-section, of a device for splicing two lengths of film in its operating position with two lengths of film in the process of being spliced.

FIG. 3a shows detail of FIG. 3 corresponding to the part thereof within circle A, on an enlarged scale.

FIG. 4 is a detailed view in cross-section taken along line 4—4 of FIG. 5a of a film cutting unit and the system for dispensing the adhesive splicing tape in the device for splicing two lengths of film shown in side view in FIG. 1.

FIGS. 5a and 5b are detailed side views taken in the direction of arrow B in FIG. 3 of the film cutting unit shown in cross-section in FIG. 4 in its respective non-operational position allowing one or several lengths of film material to pass freely therethrough and its operating position for cutting the ends of lengths of film that are to be spliced.

DETAILED DESCRIPTION OF A PREFERRED EMBODIMENT

Figure 1:
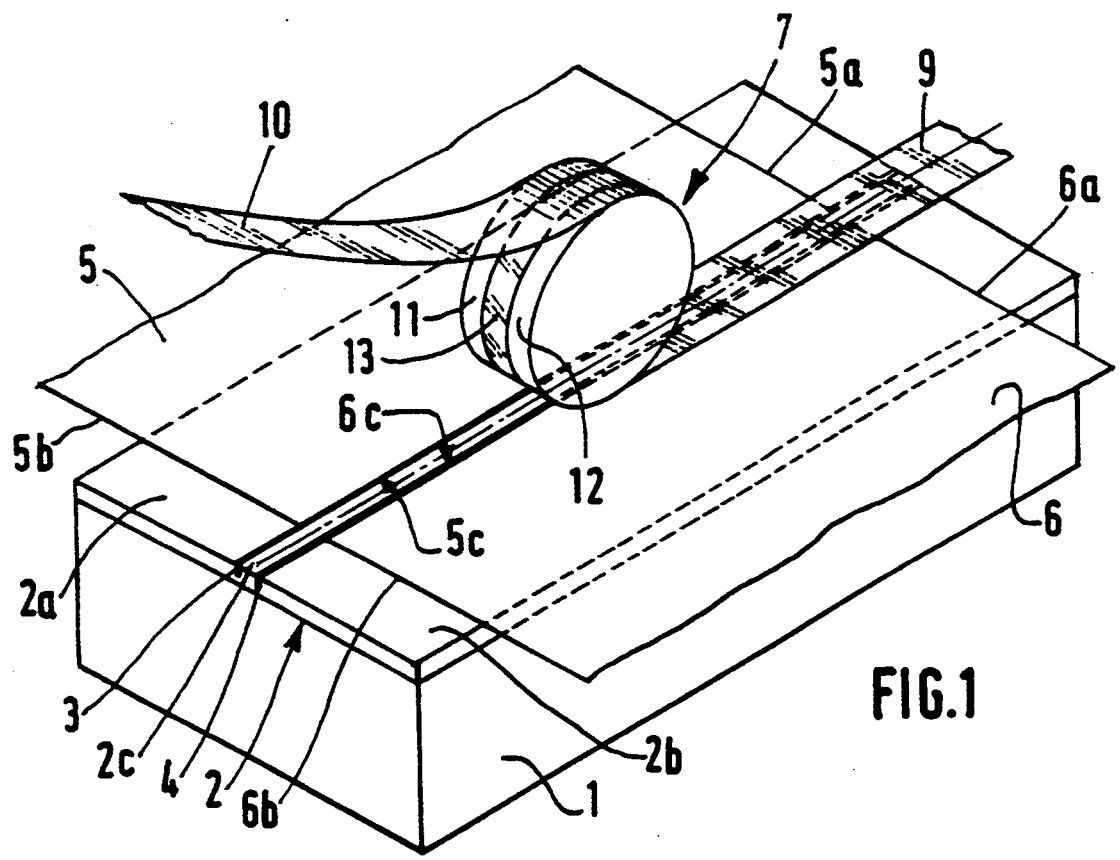
FIG. 1 is a diagrammatical view in perspective of a device for splicing two lengths of thin film using a vacuum table, in accordance with the invention.

FIG. 1 illustrates diagrammatically the method according to the invention for splicing two webs of thin film. A vacuum box 1 adapted to be connected to a source of negative pressure, in other words for providing air vacuum (not shown) carries a vacuum table 2 at its top portion, taking the form of a porous plate carrying two narrow parallel grooves 3 and 4 designed to guide a cutting blade, as will be explained below.

In the method according to the invention, two ultra-thin webs of film 5 and 6 (their minimum thickness can be as low as 0.9 micron but is most frequently of the order of several microns) are to be spliced to form a continuous run, in other words by the establishment of perfect or quasi-perfect alignment of the two webs of film. Before making the splice, the end portions of the two lengths of film are applied successively onto the vacuum table 2 which is under negative pressure. End portion 5 is for example the first one to be applied, and is carefully aligned over the whole surface of table 2, the vacuum pressure ensuring that it is firmly held onto the plane surface of the table 2, after which it is cut by a cutting blade (not shown here) which engages in guide groove 3 in order to provide a neat cut that is strictly perpendicular to the strip of film 5.

The three parts 2a, 2b and 2c of the vacuum table, respectively bordering each side of grooves 3 and 4 and lying between grooves 3 and 4, are separately linked to a source of negative pressure, consisting for example of a vacuum pump, via individual valves (reference to FIG. 3 will give an idea of the separate means employed for putting the three parts 2a, 2b, 2c of vacuum table 2 under vacuum). After making the crosswise cut through film 5, the negative pressure acting on the parts 2c and 2b of the vacuum table is removed, followed, if necessary, by setting of the corresponding part of the vacuum box to a pressure slightly above atmospheric pressure, in other words by blowing air through the porous plates of parts 2b and 2c. This makes it possible to detach and remove the offcut or trim left after cutting which is laying on parts 2b, 2c of the table, while the film portion 5 remains firmly held onto the part 2a of the table surface that is kept under sub-atmospheric pressure.

With the film 5 now ready for splicing, the end portion of a web of film 6 is now brought into exact alignment therewith (in other words fitting it exactly over film 5), this end, prior to cutting, extending beyond groove 4. The parts 2b and 2c of table 5 are now again put under sub-atmospheric pressure thus causing film 6 to adhere firmly to the table surface at the parts 2b and 2c thereof while the free end of film 6 simply lays on top of film 5 which itself is firmly held onto part 2a of the table surface. Next, the end of film 6 is cut by a knife guided by groove 4. After shutting off the sub-atmospheric pressure acting on table portion 2c (and changing over to slight positive pressure if need be), the trim or offcut of film 6 that was adhering onto vacuum table part 2c can be detached from the table surface and then removed along with the remainder of the trim laying on top of the already cut film 5. By this means, the two facing ends of films 5 and 6 are provided with a clean cut which accurately is positioned and is strictly perpendicular to the longitudinal direction of the two webs of film that are now held in perfect alignment on the surface of the vacuum table.

Figure 2:
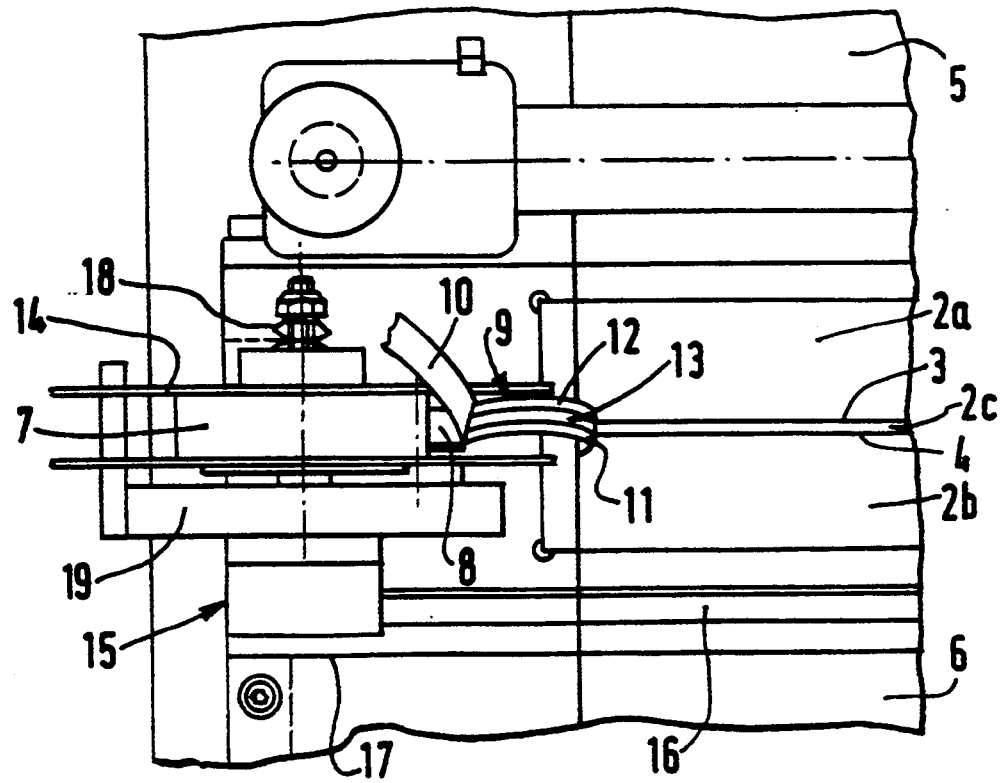
FIG. 2 is a partial front view of the actual vacuum table employed in the splicing device shown diagrammatically in FIG. 1.

In order to join the two end of films 5 and 6, an ultra-thin adhesive tape is employed which is prepared on a reel of composite material. This reel of composite material which is shown diagrammatically in its position of use and is indicated generally by reference numeral 7, consists of a wound composite roll 8 (see FIG. 2 as FIG. 1 does not show the composite structure of the tape).

The composite tape 8 consists of a first strip of thin film 9 in a polymeric material and a second strip 10 in a material which adheres poorly to adhesives, such as a silicone-impregnated backing layer, which here is substantially of the same width as the thin film strip, and is several times thicker than the thin film. Between the first thin film strip 9 and the second backing layer strip 10, the composite material includes two parallel layers 11, 12 of an adhesive having considerable adhesive power but exhibiting a far greater tendency to adhere to the polymeric material of film 9 than to the backing layer 10.

The adhesive is provided in the form of two parallel stripes 11, 12 running along the two outer sides of one face of the polymeric material film 9, leaving an adhesive-free region 13 therebetween the width of which is similar to or slightly greater than the distance separating the two guide grooves 3, 4. Adhesive that was applied to the backing layer 10 gets transferred onto the face of the first strip facing the backing layer when contact takes place between the adhesive and the surface of the first strip 9.

As can be seen in FIG. 1, prior to applying the thin film strip 9 simultaneously onto the two facing end portions of films 5 and 6 to be spliced and which are separated by vacuum table portion 2c, the backing layer 10 is first lifted off from the two adhesive stripes 11 and 12 and following this the thin strip 9 is accurately applied to the two film portions 5, 6 to be spliced starting from one end of the cut through the two films and proceeding to the other end of the cut while progressively peeling off the strip of silicone-impregnated backing layer. In this way, only a short length of the adhesive stripes 11 and 12 is exposed during the operation of applying the adhesive polymeric strip 9, thus considerably reducing the danger of the powerful adhesive material clinging to some foreign body which might accidently be present, such as dust or other pollutants. As soon as the bonding operation of polymeric film 9 has been completed up to the other end of the cut end of films 5 and 6, the tape 9 is cut and the silicone backing strip 10 can be folded back over the exposed adhesive stripes 11 and 12 in order to prevent any possible subsequent pollution thereof. Following this, the sub-atmospheric pressure acting over the whole vacuum table surface is released and the projecting two ends of the thin polymeric film 9 are trimmed transversely to the splices and in alignment with the respective edges 5a, 6a and 5b, 6b of the spliced length of film in order to terminate the splicing operation. The two stripes of adhesive 11 and 12 are in fact arranged so as to lie at a slight distance from the respective outer longitudinal sides of the adhesive tape 9 and, after application of the adhesive tape to the two webs, to stop slightly short of the two respective facing ends 5c, 6c of the two portions of spliced film 5, 6 whereby the adhesive film can spread slightly under pressure when there is contact between tape 9 and the portions 5 and 6 of spliced film without the adhesive overflowing beyond the respective edges.

The definitive splice between the two portions of film using the polymeric tape 9 which is extremely thin (whenever possible, it should have substantially the same thickness as the two web portions of film 5 and 6 to be spliced), and a layer of adhesive that is even thinner after being squeezed and drying, makes it possible to provide a splice structure which, when considered in the longitudinal sense of the spliced web, consists of a splice that is only twice as thick as the film to be spliced followed, in the central portion between the two splices, with a return to the thickness of the original film, this being followed by the second splice which again is only twice the thickness of the film, this ensuring that the splices behave perfectly during winding operations or, when for example the film is used as a backing material for a magnetic material coating for passage of a read/write head, or yet again, during slitting of the wide film into narrower strips. Practice has shown that the quality and accuracy of the splice are such that it cannot be detected by the naked eye, particularly in the case where the adhesive tape 9 used to provide the splice is of the same material as that of the two webs of film to be spliced.

In the partial side view of FIGS. 3 and 3a the portions 2a, 2b, 2c of the vacuum table together with the crosswise cutting knife guide grooves 3 and 4 will be recognized. The composite adhesive tape 8 is wound on a dispenser reel 14 carried on a carriage 15 which moves transversely with respect to the film 5 and 6 to be spliced, on a dual-guiding slide 16, which, in FIG. 3, can be seen in cross-section, and is secured onto a strong cross member 17.

The reel 14 rotates on a central pivot 18 (see also FIG. 4) which is secured parallel to the plane of the vacuum table 2, on an upright 19 of the frame structure of carriage 15. The lower portion of upright 19 carries a cutting unit 20 arranged above the vacuum table 2 but only separated by a very small distance therefrom, this being shown in greater detail in FIGS. 4 and 5.

FIG. 3 also shows a cross-section through the vacuum box 1. Three separate chamber 21, 22, 23 are defined below the porous plate 2 of the vacuum table and each of these is connected by an airtight connector 21a, 22a, 23a and flexible or rigid conduits to valves 21b, 22b, 23b which can either be connected to a source of sub-atmospheric pressure (vacuum pump) or to atmospheric pressure to release a vacuum, or even, if necessary, to a source of compressed air to aid in the lifting off of portions of film that are adhering firmly to the vacuum table. The vacuum box 1 which, for example, is a metal casting, is carried by a frame structure 24 which includes, apart from cross member 17 carrying the slide 16, strengthening members (see cross member 25) an auxiliary winding roller 26 rotatably mounted on extension members 27, together with guide rolls 28, 29 and 30 for the film, roll 29 having an elastomer outer surface.

The structure of the vacuum table 2 in the critical region indicated inside circle A of FIG. 3, is shown on a much larger scale in FIG. 3a enabling the two grooves 3 and 4 to be seen, these having a rectangular cross-section separating the vacuum table into three successive regions 2a, 2b, 2c. A knife 31, and, respectively, 32 can be engaged into each of these grooves in order to cut the film which is firmly applied by suction onto the porous vacuum table 2.

In FIG. 3a, the film 6 is shown as having already been unwound via guide roll 29 until all spare film from the roll of film that preceded roll 33 has been wound off. The spare film end 6 is then cut by knife 32, its end edge 6c portion being "stuck" to portion 2b of vacuum table 2 by the sub-atmospheric pressure prevailing therebelow. The other portion of film, 5, which is to be spliced to portion 6 of the film is unwound from a new large diameter roll 33. Before making the splice, the film portion 5 is passed under guide roller 28 before moving on to the vacuum table 2 of which only chamber 23 is held under sub-atmospheric pressure. The end portion of film 5 can readily slide over vacuum table 2 to a position where it overlaps the end portion of film 6, careful positioning being carried out until film portions 5 and 6, which, in principle, have the same width come into exact alignment with each other, several turns of film portion 5 being rewound onto auxiliary roll 26 and the film adequately tensioned. After this, vacuum chambers 21 and 22 are put under sub-atmospheric pressure by operating valves 22b and 21b which causes the film portion 5 to firmly "stick" onto the vacuum table in the regions 2a and 2c. It is now possible to make a transverse cut through the film portion 5 by means of knife 31 which moves along inside groove 3, with the several turns of film wound onto auxiliary roll 26 remaining in place as offcut or trim. As a simplified alternative, to reduce the length of offcut at the end of film portion 5, the latter can be positioned manually and tensioned, this solution requiring however the intervention of highly skilled labor in order to guarantee the same splice quality.

In FIG. 3a, the two knives or blades 31 and 32 have been shown simultaneously cutting the film and leaving portions of offcut or trim 5d and 5e but is also possible, as shown in FIGS. 5a and 5b, to only bring knife 31 into position. The portions of offcut 5d and 5e are removed after chamber 22 is no longer subject to sub-atmospheric pressure, by operating valve 22b (and blowing if necessary), the chamber 21 being kept under sub-atmospheric pressure in order to retain the end portion of film 5. The two end portions of films 5 and 6 are thus firmly held in position ready to receive the adhesive tape 9 using the method illustrated, as regards its initial steps, in FIG. 2, and described above with reference to FIG. 1. With the film portions 5 and 6 now spliced by means of polymeric tape 9 and its two stripes of adhesive 11 and 12, winding via guide roll 29 can now be restarted.

FIG. 5b shows film portion 5 during a cutting operation. The frame member 19 carries an arm 33 which rotates about pin 33a and which is urged by means of a flat spring 34 towards film portion 5 (or 6) in order to apply a small press-on roller or hold-down cylinder 35 thereto. A knife support 36 which can rotate about a pivot pin 36a integral with a plate 36b screwed onto frame member 19, carries a knife holder 37 which retains the knife blades 31 and 32 which are axially separated by a distance d, which corresponds to the distance between the grooves 3 and 4. In FIG. 5b, blade 32 is engaged in groove 4 for cutting film portion 6.

FIG. 5a shows the non-operating position of cutting unit 20. A pin 38 with a knurled head 38a has been engaged in a hole 39 (see FIG. 5b) of a retaining plate 40, in order to hold press-on roller 35 away from the film 5, 6 which moves at high speed during winding. Similarly, a pin 41 with a knurled head 42 has been engaged into the central hole 43 of a series of three holes 43, 44, 45 the two outer holes of which, 44 and 45, are used for locking the cutting positions of the blades 31, 32 by engagement of pin 41 therein.

Perfect guiding, obtained by the two guiding surfaces of slide 16, of knife 31 or 32 in grooves 3 and 4 while film portions 5, 6 are kept held down by suction applied at both sides of the grooves 3 and 4, as well as perfect guiding of reel 14 which enables the adhesive tape 9 to be applied strictly perpendicular to the axis of film portions 5 and 6, ensures that the adhesive tape 9 is applied accurately to the end portions of film which are firmly held in position by sub-atmospheric pressure.

The present invention is obviously not limited to the embodiments which have been described and illustrated above but may be subject to numerous variations available to those skilled in the art without this however leading to a departure from the scope of the invention.

What is claimed is:

1. A method for splicing a first web of film or sheet material to a second web thereof comprising the steps of: applying an end portion of a first web of film to the surface of a vacuum table by applying sub-atmospheric pressure thereto and making a straight transverse cut through said first web by knife means cooperating with a first transverse groove provided in said vacuum table, removing the sub-atmospheric pressure below the portion of said first web that has been trimmed off and removing said trimmed-off portion of film, applying the end portion of said second web of film onto the portion of said vacuum table not covered by said first web and allowing the end of said second web to overlap the previously-trimmed first web, the whole surface of said vacuum table being under sub-atmospheric pressure, providing a straight transverse cut through said second web by cooperation of cutting means with a second groove in said vacuum table parallel to said first groove and adjacent thereto, removing the thus-trimmed portion of said second film from the surface of said table together with the portion thereof overlapping said first web after, if necessary, removing said sub-atmospheric pressure only in the part of said vacuum table comprised between said first and second grooves, and simultaneously applying to said first and second web end portions an adhesive tape of which at least the portion that faces the gap between said first and second grooves does not contain adhesive and then removing said sub-atmospheric pressure over the whole surface of said vacuum table in order to release the spliced webs of film.

2. A method according to claim 1, wherein said adhesive tape carries at the surface thereof two continuous stripes of adhesive which extend up to the region of, but not exactly to the edge of, the lateral sides of said tape where it ceases to be in contact with either of said web portions in order to prevent any overflow of adhesive resulting from supplementary spreading of the adhesive during the passage of said tape over the two film portions to be spliced.

3. A method according to claim 1, wherein said adhesive tape is covered, on the side thereof bearing said continuous stripes of adhesive, with a backing strip or layer in a material exhibiting low adhesion towards said adhesive, said adhesive tape covered with said backing layer being provided in roll form, said roll being unwound onto the facing end portions of the two webs of film to be spliced while removing said backing strip immediately prior to applying said adhesive tape onto the two facing end portions of said webs.

4. A method according to claim 1, wherein during application of said adhesive tape onto the two end portions of said webs to be spliced, the part of said vacuum table comprised between said first and second grooves is maintained under sub-atmospheric pressure in order to retain said adhesive tape firmly pressed onto the end portions of said first and second webs.

5. A device for splicing first and second webs of film or sheet material together comprising a roll supplying a web of film material, a roll for winding a web of film material and a splicing table adapted to be selectively subject to sub-atmospheric pressure and having a first groove therein defining a cutting line over which either of said first or second continuous webs of film can be placed, and means for applying a splicing tape to unite said first and second webs of film, wherein said splicing table includes a second groove that is parallel to said first groove, said first and second grooves being perpendicular to the longitudinal direction of said first and second webs of film and being separated by a small space from each other, said small space being substantially less than the width of said splicing tape, said vacuum table being split into three regions each individually adapted to be put under sub-atmospheric pressure and comprising the region between the two said grooves and two regions at each side of the said grooves, said regions being adapted to be linked by valve means to sub-atmospheric pressure generating means whereby each one of said three zones can be individually or simultaneously put under sub-atmospheric pressure in order to retain at least one of said web portions of film firmly on said table or to allow removal thereof by releasing said sub-atmospheric pressure.

6. A device according to claim 5, wherein it includes a reel for applying an adhesive splicing tape to film web portions retained on said vacuum table by unwinding said adhesive tape therefrom, said application reel being rotatably mounted on a support adapted to move in a direction perpendicular to the plane of said vacuum table up to a position where it no longer hinders the passage of a web of said film to a winding unit.

7. A device according to claim 5 wherein it includes a carriage able to move along sliding guiding means perpendicular to the longitudinal direction of advance of said web of film and which simultaneously carries in a releasable manner, a roll of adhesive tape that is substantially centered on the two grooves of said vacuum table, said carriage being able to move between an operating position and a non-operating position, at least one cutting unit adapted to apply, in said operating position, a knife blade means into at least one of said grooves in order to cut said web portions of film at positions corresponding to said grooves whereby said cut web portions of film are only separated by the gap between said two parallel grooves.

8. A device according to claim 7, wherein said cutting unit includes a blade holder clamping two thin cutting blades adapted to pivot about a pivot pin to adopt one of three positions that are manually locked by a locking means, comprising two cutting positions and a central non-active position.

9. A device according to claim 7, wherein said cutting unit includes a pivoting arm carrying a press-on roller which is urged towards the surface of said vacuum table by spring pressure.

10. A device according to claim 9, wherein said pivoting arm is manually lockable in a non-active position against the urging force of said spring means by manual locking means.

* * * * *